US011076062B2

(12) United States Patent
Sekine

(10) Patent No.: US 11,076,062 B2
(45) Date of Patent: Jul. 27, 2021

(54) INFORMATION PROCESSING DEVICE CAPABLE OF SWITCHING LANGUAGE OF NAME OF ICON, METHOD OF CONTROLLING INFORMATION PROCESSING DEVICE, AND A NON-TRANSITORY COMPUTER-READABLE STORAGE MEDIUM

(71) Applicant: CANON KABUSHIKI KAISHA, Tokyo (JP)

(72) Inventor: Hiroshi Sekine, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/503,289

(22) Filed: Jul. 3, 2019

(65) Prior Publication Data

US 2020/0021701 A1 Jan. 16, 2020

(30) Foreign Application Priority Data

Jul. 12, 2018 (JP) .............................. JP2018-132480

(51) Int. Cl.
*H04N 1/00* (2006.01)

(52) U.S. Cl.
CPC ..... *H04N 1/00498* (2013.01); *H04N 1/00413* (2013.01); *H04N 1/00474* (2013.01); *H04N 1/00493* (2013.01); *H04N 2201/0094* (2013.01)

(58) Field of Classification Search
None
See application file for complete search history.

(56) References Cited

U.S. PATENT DOCUMENTS

2004/0207658 A1* 10/2004 Awada ................... G06F 9/451
715/747
2012/0124522 A1* 5/2012 Ookuma ............. G06F 3/04817
715/840

FOREIGN PATENT DOCUMENTS

JP 2006-015623 A 1/2006

* cited by examiner

*Primary Examiner* — Lennin R Rodriguezgonzalez
(74) *Attorney, Agent, or Firm* — Canon U.S.A., Inc. IP Division

(57) ABSTRACT

An information processing device capable of executing at least one function: displays an icon selection screen displaying an icon including an image indicating the function and a name of the function; accepts selection of the icon through the displayed icon selection screen; executes processing of the function corresponding to the icon, in accordance with the acceptance of the icon: and switches a language used for display of the name of the icon on the icon selection screen to a different language every predetermined time.

16 Claims, 14 Drawing Sheets

FIG. 10

| | 1001 | 1002 | 1003 | 1004 |
|---|---|---|---|---|
| | PAGE | ICON NAME | ICON IMAGE FILE | APPLICATION INFORMATION |
| | 1 | COPY | copy.jpg | COPY APPLICATION |
| | 1 | SCAN | scan.jpg | SCAN APPLICATION |
| | 1 | FAX | fax.jpg | FAX APPLICATION |
| | 1 | INFORMATION | info.jpg | INFO-APPLICATION |
| | 1 | GENGO KIRIKAE | lang30.jpg | LANGUAGE-SWITCHING APPLICATION |
| | 1 | SETTING | setting.jpg | SETTING APPLICATION |

*FIG. 13*

| 1401 | 1402 | 1403 | 1404 |
|---|---|---|---|
| LANGUAGE No. | LANGUAGE ID | ICON NAME | ICON IMAGE FILE |
| 1 | 30 | GENGO KIRIKAE | lang30.jpg |
| 2 | 01 | Change Lang | lang01.jpg |
| 3 | 21 | Sprache | lang21.jpg |
| 4 | 00 | IN0000 | Na |
| 5 | 00 | IN0000 | Na |

INFORMATION PROCESSING DEVICE CAPABLE OF SWITCHING LANGUAGE OF NAME OF ICON, METHOD OF CONTROLLING INFORMATION PROCESSING DEVICE, AND A NON-TRANSITORY COMPUTER-READABLE STORAGE MEDIUM

BACKGROUND

Field of the Disclosure

The present disclosure relates to an information processing device, a method of controlling the information processing device, and a program.

Description of the Related Art

An information processing device capable of executing a function, such as a copy function or a scan function, is used by various users who use different languages. Thus, a user who uses any language can set a language for use from a plurality of languages, so that the user can perform an operation. For example, in a case where desiring to perform an operation in Japanese, the user sets display language to Japanese. Then, the information processing device displays an operation screen in Japanese on a display.

A display operation device described in Japanese Patent Laid-Open No. 2006-15623, causes a display unit to display, in sequence, respective copy operation screens displayed in a plurality of languages previously set by users. This arrangement enables a user who uses any language to perform an operation at the timing that the operation screen is displayed in the language that the user desires to use.

As a screen that an information processing device displays, similarly to the above, there is an icon selection screen that displays icons selectable by a user. The icon selection screen displays, for every function executable by the information processing device, an image for identifying the function as an icon. While viewing the icons displayed on the icon selection screen, the user selects an icon corresponding to the function that the user desires to execute. The information processing device executes the function corresponding to the icon selected by the user.

Display of the names of the functions together with the images on the icon selection screen, enables the user to select an icon easily.

However, an icon selection screen in Japanese Patent Laid-Open No. 2006-15623 has not considered display of such selectable icons. Thus, a user who cannot understand a language used for display of the names of icons on the icon selection screen, has difficulty in selecting an icon associated with the function that the user desires to use.

SUMMARY

According to embodiments of the present disclosure, an information processing device is provided that executes processing corresponding to an icon selected by a user, the information processing device enabling even a user who uses any language to select an icon associated with desired processing, easily.

According to some embodiments, an information processing device capable of executing a plurality of functions is provided, the information processing device including: a display unit configured to display an icon selection screen displaying an icon including an image indicating each of the functions and a name of the function; an acceptance unit configured to accept selection of the icon through the icon selection screen displayed by the display unit; an execution unit configured to execute processing of the function corresponding to the icon, in accordance with the acceptance of the icon by the acceptance unit; and a switching unit configured to switch a language used for display of the name of the icon on the icon selection screen to a different language every predetermined time.

Further features of the present disclosure will become apparent from the following description of exemplary embodiments (with reference to the attached drawings).

BRIEF DESCRIPTION OF THE DRAWINGS

FIG. 10 is an illustration of an exemplary table for managing information regarding the icons to be displayed on the home screen in the first embodiment.

FIG. 13 is an illustration of an exemplary table for managing setting values of the language-switching application in the first embodiment.

DESCRIPTION OF THE EMBODIMENTS

First Embodiment

An Embodiment of the present disclosure will be described below with the drawings.

Figure 1:
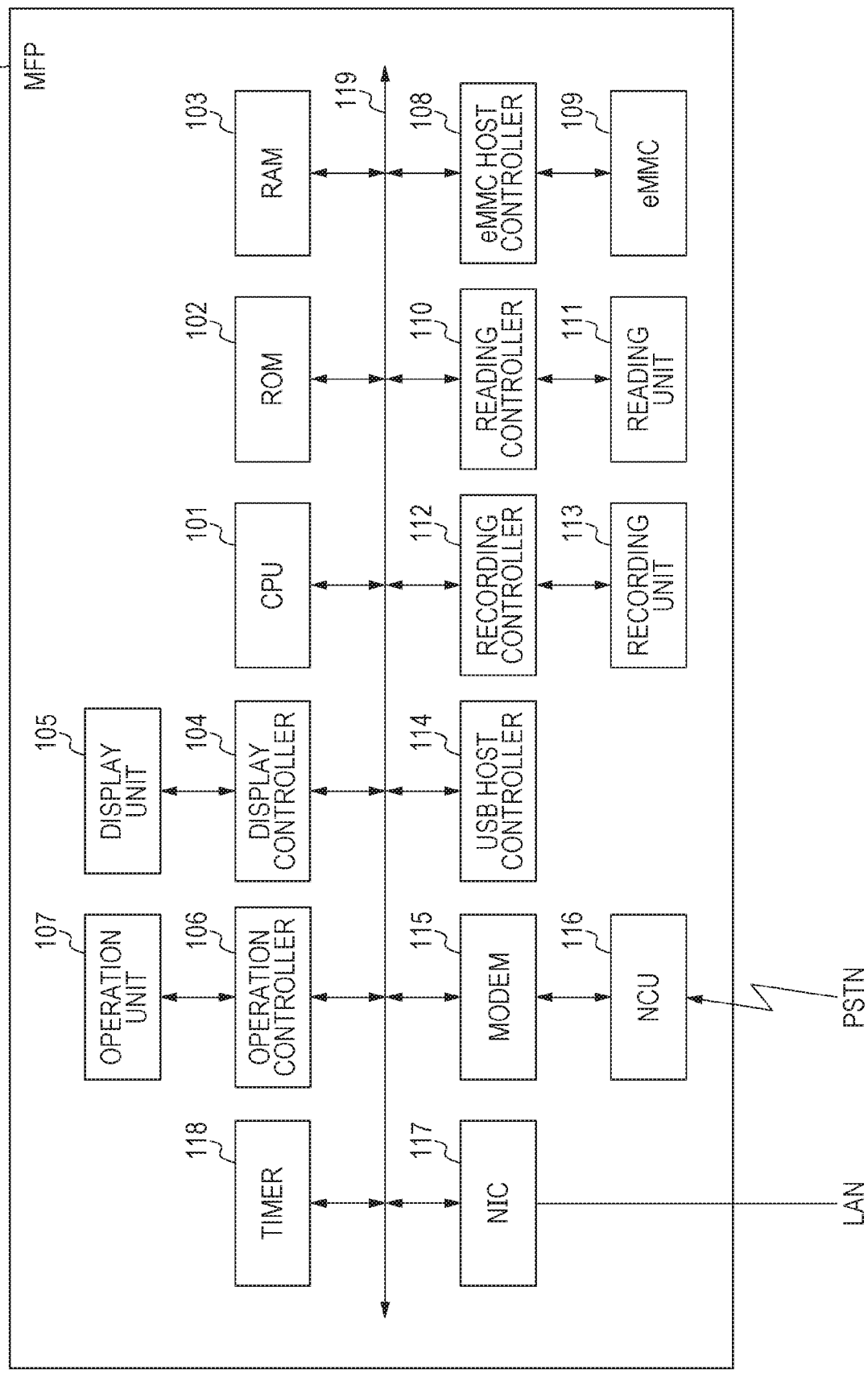
FIG. 1 is a block diagram of the hardware configuration of an MFP according to the present embodiment.

FIG. 1 is a block diagram of the hardware configuration of an MFP 10 that operates as an information processing device in the present embodiment.

As illustrated in FIG. 1, the MFP 10 includes a CPU 101, a ROM 102, a RAM 103, a display controller 104, a display unit 105, an operation controller 106, and an operation unit 107. The MFP 10 includes an embedded multi media card (eMMC) host controller 108, an eMMC 109, a reading controller 110, a reading unit 111, a recording controller 112, and a recording unit 113. The MFP 10 further includes a USB host controller 114, a MODEM 115, a network control unit (NCU) 116, a network interface card (NIC) 117, and a timer 118.

The CPU 101 collectively controls each device connected to a system bus 119. Supply of power causes the CPU 101 to execute a boot program stored in the ROM 102. For example, the RAM 103 functions not only as a load area for a main program but also as a work area for the main program. The CPU 101 executes each program to execute processing in a flowchart to be described later.

The display controller 104 controls drawing to the display unit 105. The display unit 105 is a full-bitmap liquid crystal display (LCD). Meanwhile, the operation controller 106 controls input from the operation unit 107 included in the MFP 10. The operation unit 107 includes a touch panel superimposed on the display unit 105. A user performs a touch operation to the operation unit 107, to operate the MFP 10.

The reading unit 111 reads an original document and generates image data. The reading unit 111 equipped with an auto document feeder (not illustrated) as an option, can continuously read a plurality of original documents. The reading unit 111 is connected to the reading controller 110, and the CPU 101 performs exchange with the reading unit 111 through the reading controller 110.

The recording unit 113 performs image forming to a recording sheet by electrophotography. The recording unit 113 is connected to the recording controller 112, and the CPU 101 performs exchange with the recording unit 113 through the recording controller 112.

The USB host controller 114 for USB protocol control, controls access to a USB device, such as a USB memory (not illustrated).

The MODEM 115 performs modulation/demodulation of a signal necessary for facsimile communication. The MODEM 115 is connected to the NCU 116. The signal modulated by the MODEM 115 is transmitted to a public switched telephone network (PSTN) through the NCU 116.

The NIC 117 exchanges data with, for example, a mail server or a file server through a LAN, bidirectionally. The NIC 117 exchanges data with, for example, a Web server, bidirectionally.

The MFP 10 according to the present embodiment, includes the eMMC 109 as a storage. The eMMC 109 that is a type of nonvolatile memory, can retain data even when power is off. The CPU 101 accesses the eMMC 109 through the eMMC host controller 108. According to the present embodiment, the eMMC 109 is used as a nonvolatile memory, but a different memory, such as a HDD, may be used as a nonvolatile memory.

The timer 118 measures a time set by the CPU 101. The tinier 118 outputs an interrupt signal to the CPU 101 after the elapse of the set time, to notify the CPU 101 that the set time has elapsed. The CPU 101 that has received the interrupt signal from the timer 118, reads a program from the RAM 103, to execute processing corresponding to the interrupt signal.

Figure 2:
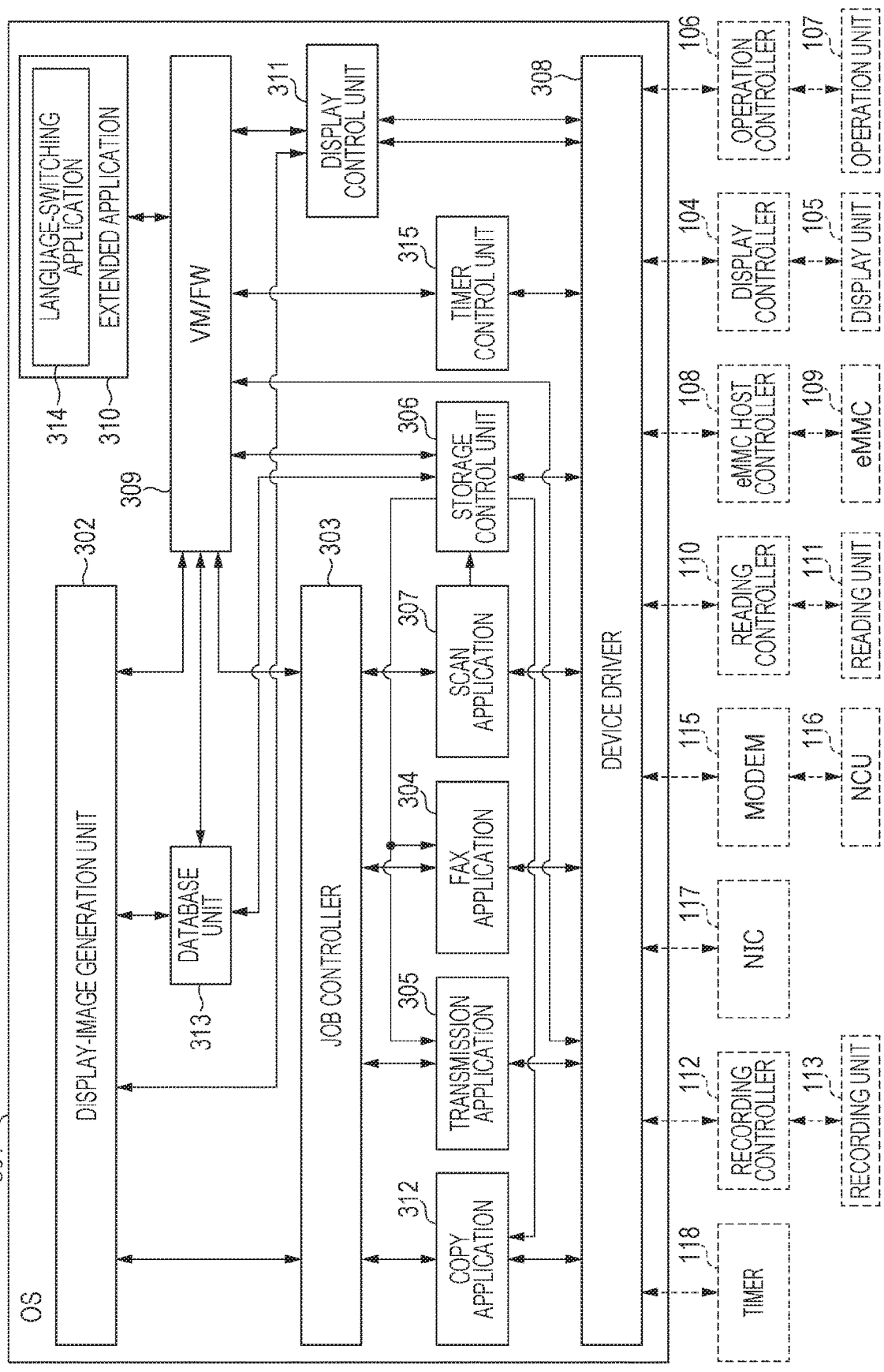
FIG. 2 is a block diagram of the software configuration of the MFP according to the present embodiment.

FIG. 2 is a block diagram of the software configuration of the MFP 10 according to the present embodiment. Each constituent indicated with a solid line in FIG. 2, is a software module to be achieved by execution of the main program loaded to the RAM 103 by the CPU 101.

An operating system (OS) 301 performs management/control of execution of each module to be described later.

A device driver 308 controls exchange with hardware devices, such as the display controller 104, the operation controller 106, and the reading controller 110.

A display-image generation unit 302 executes, for example, processing of generating a screen to be displayed on the display unit 105 and processing of generating an icon to be described later. Then, the icon and the screen generated by the display-image generation unit 302 are displayed on the display unit 105. Furthermore, the display-image generation unit 302 generates a remote UI screen to be displayed on a display unit of an external device, such as a PC, having access to the MFP 10. The remote UI screen generated by the display-image generation unit 302, is transmitted to the external device through the NIC 117.

A job controller 303 accepts job execution of a function, such as copying, printing, or faxing, and controls the accepted job execution.

A storage control unit 306 is a software module that physically stores data, such as images in facsimile transmission and reception or application settings requested from an extended application 310, into the eMMC 109, and manages the data.

A scan application 307, a fax application 304, a transmission application 305, and a copy application 312 are each an application of controlling a function that the MFP 10 can provide. For example, in the MFP 10 according to the present embodiment, when the job controller 303 accepts a fax-transmission job, the scan application 307 receives a request for the job, and controls the reading unit 111 to scan an original document. Then, scanned facsimile image data is stored in the RAM 103 through the storage control unit 306. The facsimile image data stored in the RAM 103 is read by the fax application 304, and then is facsimile-transmitted to the destination through the MODEM 115 and the NCU 116. As another example, image data facsimile-received from the source through the MODEM 115 and the NCU 116 is extracted by the fax application 304, and then is stored in the RAM 103 through the storage control unit 306.

The MFP 10 according to the present embodiment includes a virtual machine (VM)/framework (FW) unit 309. The VM/FW unit 309 is a software block for operating an extended application, such as a language-switching application 314. The VM/FW unit 309 serves as an intermediate for data exchange between an application included in the extended application 310 and another software block of the MFP 10. The VM/FW unit 309 serves to install or uninstall an optional program described in a script language or a predetermined high-level language, in or from the extended application 310. Then, the VM/FW unit 309 interprets and executes the described script language. This arrangement enables the MFP 10 according to the present embodiment, to achieve an optional function, such as the language-switching application 314, easily with functional scalability retained. The VM/FW unit 309 receives a request from the optional program installed in the extended application 310, and refers to or changes various setting values in a database unit 313.

The language-switching application 314 is an application of executing processing of switching the display language of the MFP 10 with a display-language icon to be described later. Furthermore, the language-switching application 314 is an application of executing processing according to display switching of the display-language icon on a home screen to be described later.

The extended application 310 includes, for example, an optional program described in a script language. The extended application 310 is an application described in a language, such as Java (registered trademark) or Lua, as an interpreter that interprets and executes bytecode.

A display control unit 311 controls output of the image data generated by the display-image generation unit 302, to the display unit 105. The display control unit 311 controls transmission of the user operation from the operation unit 107 to the display-image generation unit 302 and the extended application 310. The display control unit 311 controls transfer of input from the operation unit 107 to another software block.

A timer control unit 315 sets the timer 118 and calls a program to be processed after receiving a notification that the set time has elapsed, from the timer 118.

First, the home screen to be displayed at activation of the MFP 10 according to the present embodiment and a method of changing the display language through the home screen, will be described. An exemplary case where the user changes the display language previously set to Japanese, to English, rill be described below.

Figure 3:
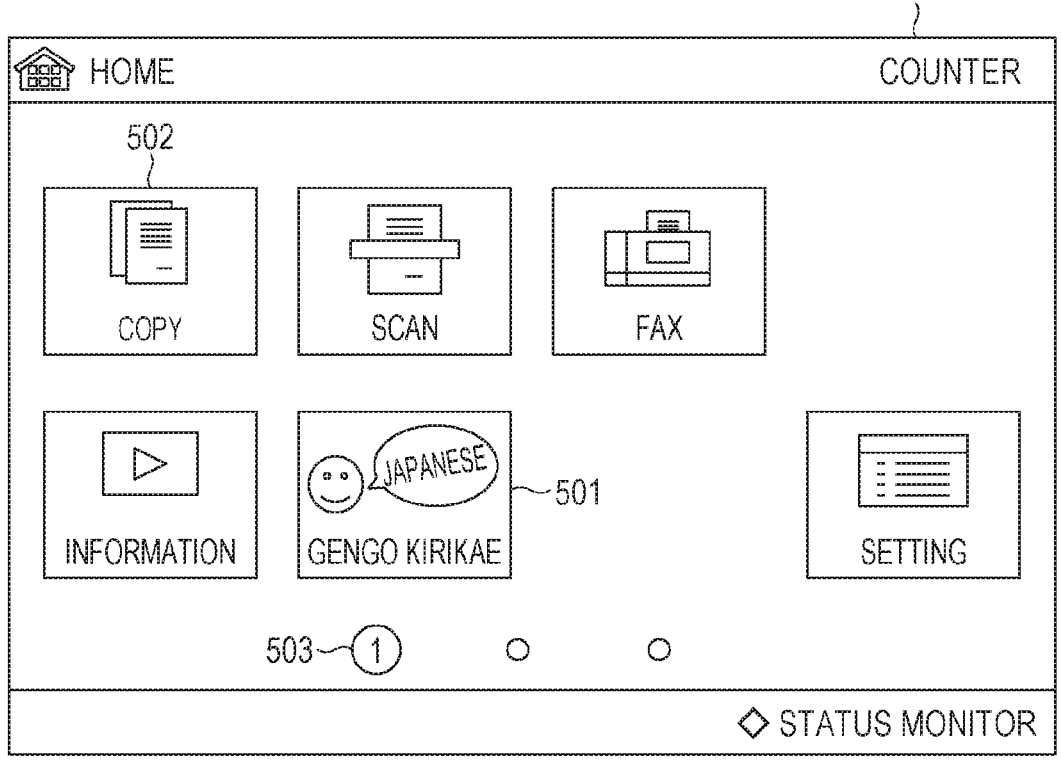
FIG. 3 is an illustration of an exemplary home screen with display language set to Japanese in the first embodiment.

FIG. 3 is an illustration of an exemplary home screen 500 to be displayed at activation of the MFP 10. Because the display language is set to Japanese, the icon names of all icons are displayed in Japanese. The user performs a tap operation to select the icon of an application to be used on the home screen, resulting in selection of a function to be used. For example, when the user selects a copy icon 502, the display control unit 311 of FIG. 2 activates the copy application 312 through the job controller 303. The copy application 312 controls the display-image generation unit 302 through the job controller 303, generates a setting screen for setting regarding a copy job, and displays the setting screen on the display unit 105. For selection of the icon corresponding to scanning or faxing, the setting screen for the function is displayed, similarly to the copy icon 502. The setting screen for each function is displayed in the set display language. For example, in a case where the display language is set to Japanese, the setting screen for copying, scanning, or faxing is displayed in Japanese.

A display-language icon 501 is an icon for switching the display language. Selection of the display-language icon 501 by a tap operation of the user, allows the display language to change in previously determined order. For example, the order of changing the display language is defined as the order of Japanese, English, and German. Selection of the display-language icon 501 by the user with the display language set to Japanese, causes the display language to change to English, resulting in display of a home screen 600 in English illustrated in FIG. 4. Note that a symbol 503 indicates which of a plurality of pages included in the home screen is displayed. The home screen 500 illustrated in FIG. 3 has overall three pages, and a flick operation of the user causes the displayed page to be switched to another. As described above, the MFP 10 accepts selection of the icon corresponding to a function to be used, through the icon selection screen illustrated in FIG. 3.

Figure 4:
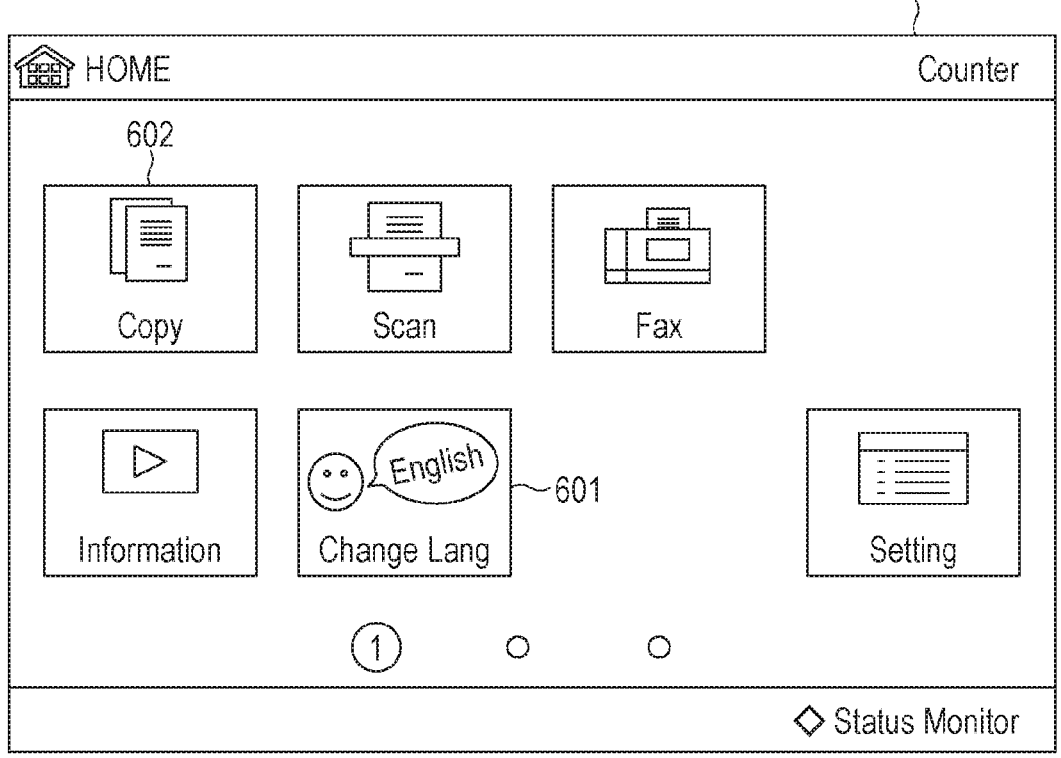
FIG. 4 is an illustration of an exemplary home screen with the display language set to English in the first embodiment.

Selection of a display-language icon 601 displayed in FIG. 4, causes the display language to change to German, resulting in display of a home screen in German on the display unit 105. Furthermore, selection of the display-language icon by the user on the home screen in German, causes Japanese to be set as the display language. Thus, selection of the display-language icon 501 by the user enables the display language of the MFP 10 to change in setting.

However, a user who cannot understand the language set as the display language, cannot grasp which icon corresponds to the language-switching application 314. Thus, according to the present embodiment, after display of the home screen, the language used for display of the display-language icon 501 switches every previously determined time. This arrangement enables even the user who cannot understand the language set as the display language, to grasp which icon is for setting the display language, so that the display language can be easily changed in setting.

Figure 5:
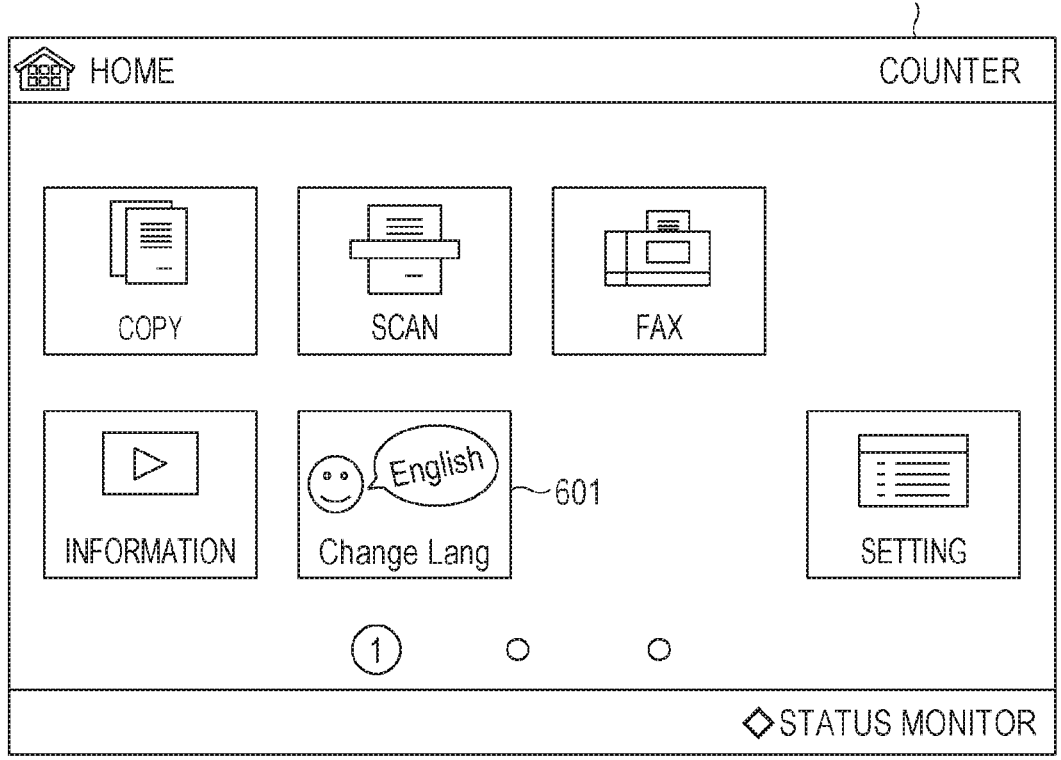
FIG. 5 is an illustration of an exemplary home screen with a display-language icon switched to a display in English in the first embodiment.

For example, in a case where the display language is set to Japanese, the home screen 500 illustrated in FIG. 3 is displayed. After the elapse of the previously determined time after display of the home screen 500 illustrated in FIG. 3, a home screen 700 illustrated in FIG. 5 is displayed. On the home screen 700 illustrated in FIG. 5, the display-language icon has switched from the display-language icon 501 in Japanese to the display-language icon 601 in English. On the home screen 700 of FIG. 5, the names of the icons except the display-language icon 601 are displayed in Japanese that is the display language being set.

Figure 6:
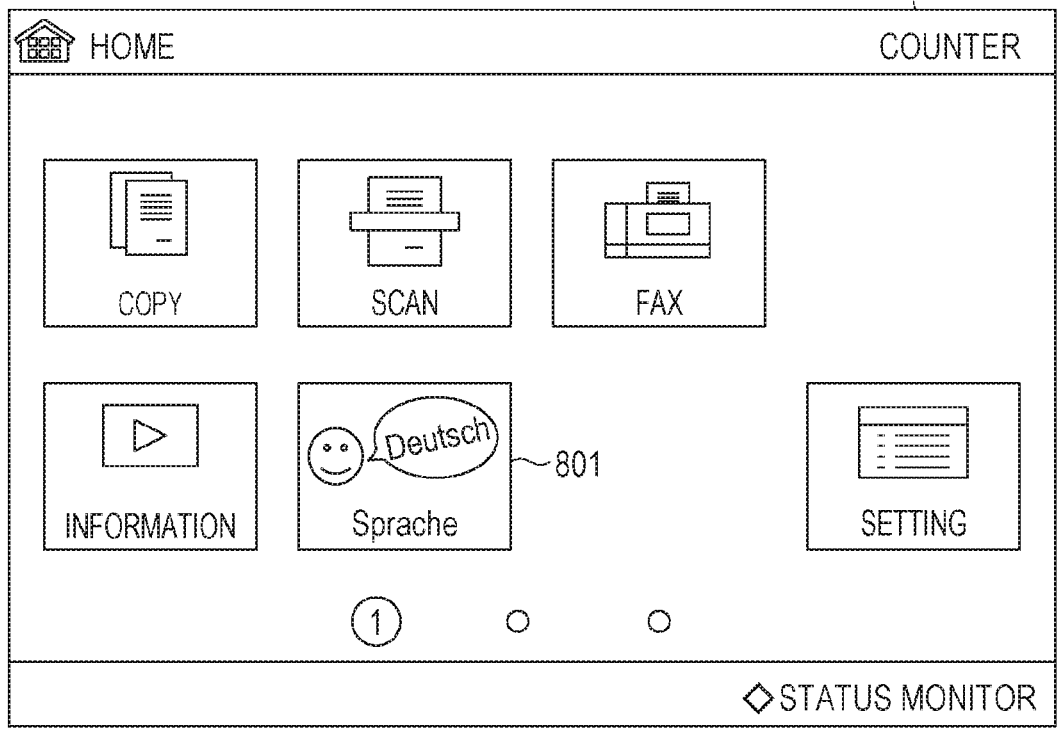
FIG. 6 is an illustration of an exemplary home screen with the display-language icon switched to a display in German in the first embodiment.

Furthermore, after the elapse of the previously determined time after display of the home screen 700 illustrated in FIG. 5, a home screen 800 illustrated in FIG. 6 is displayed. On the home screen 800 illustrated in FIG. 6, the display-language icon has switched from the display-language icon 601 in English to a display-language icon 801 in German.

After the elapse of the previously determined time after display of the home screen 800 illustrated in FIG. 6, the home screen 500 illustrated in FIG. 3 is displayed. Thus, the language used for display of the display-language icon switches every previously determined time, resulting in display by toggle indication. This arrangement enables even a user who cannot understand the display language being set, to grasp which icon on the home screen is for switching the display language.

Next, a method of setting the language-switching application 314 for switching the display language described with FIGS. 3 to 6, will be described. According to the present embodiment, the MFP 10 is accessed from the external device, such as a PC, and then the language-switching application 314 is set with a remote UI function. The language-switching application 314 may be set with the operation unit 107 of the MFP 10.

Figure 7:
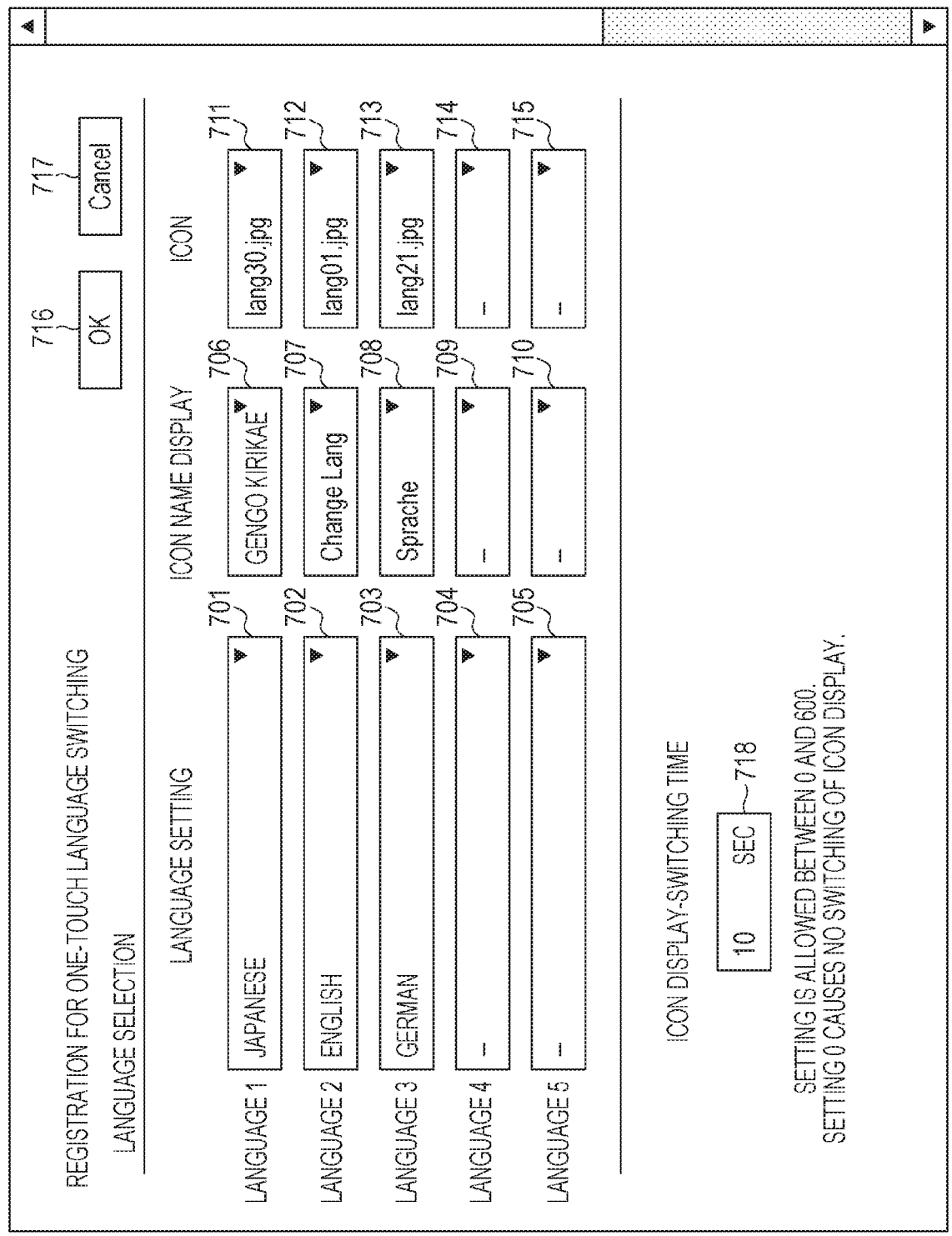
FIG. 7 is an illustration of an exemplary screen for setting a language-switching application in the first embodiment.

FIG. 7 illustrates a UI screen for setting the language-switching application of the MFP 10. The user issues an instruction for language-switching setting through the UI screen illustrated in FIG. 7. When the user issues an instruction for display of the setting screen of the language-switching application illustrated in FIG. 7 after access from the external device, such as a PC, to the MFP 10, the UI screen illustrated in FIG. 7 is displayed on the display unit of the external device, such as a PC. The display-image generation unit 302 generates data of the screen illustrated in FIG. 7, in accordance with the instruction for setting the language-switching application received through the NIC 117. Then, the MFP 10 transmits the generated screen data to the external device, such as a PC, through the NIC 117.

Language setting sections 701 to 705 are each a section for setting a language switchable with the display-language icon 501. According to the present embodiment, use of the display-language icon 501 enables switching between five languages at maximum. In FIG. 7, Japanese, English, and German are each set as the language switchable with the display-language icon. Note that another two languages can be set in FIG. 7. According to the present embodiment, selection of the language setting section 701 causes display of a list of languages settable as the display language, and then the user selects a language to be set from the list. Although five languages can be set maximum according to the present embodiment, the number of settable languages is not limited to the above.

Figure 8:
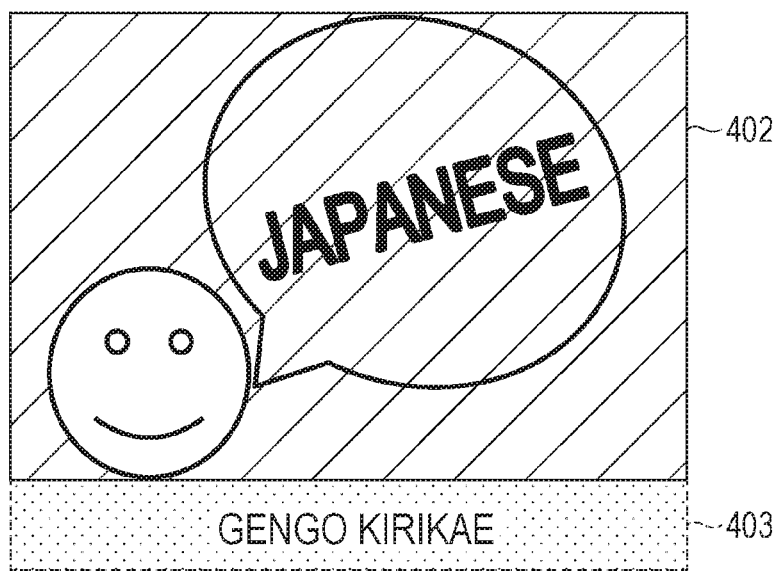
FIG. 8 is a schematic illustration of the configuration of an icon in the present embodiment.

Furthermore, sections each for setting an icon name and sections each for setting an icon image are provided on the UI screen for setting the language-switching application illustrated in FIG. 7. According to the present embodiment, an icon includes an icon image portion 402 and an icon name portion 403 as illustrated in FIG. 8. Icon name sections 706 to 710 are each a section for setting a character string to be displayed at the icon name portion 403. Icon image sections 711 to 715 are each a section for setting the icon image portion 402.

When the user selects one of the icon name sections 706 to 710, a list of character strings usable as the icon name is displayed. The user selects a character string to be used from the displayed character strings. When the user selects one of the icon image sections 711 to 715, a list of icon images usable is displayed, so that the user can select an icon to be used.

A display-switching time section 718 is a field for setting the switching time between display of the display-language icon in a language and display of the display-language icon in another language. For example, when the display-switching time section 718 has ten seconds set therein, the display-language icon 601 in English is displayed after the elapse of ten seconds after display of the display-language icon 501 in Japanese. Furthermore, after the elapse of ten seconds after display of the display-language icon 601 in English, the display-language icon 801 in German is displayed. According to the present embodiment, the same display-switching time is set for any language. The display-switching time may change every language. For example, the display time of an often-used display-language icon may be set long and the display time of a little-used display-language icon may be set short. An "OK" button 716 is a button for storing the setting values set through the setting screen into the RAM 103 and setting the setting values effectively. A "Cancel" button 717 is a button for canceling the setting values set through the setting screen and making the setting values previously stored in the RAM 103 effective.

In FIG. 7, examples of the language switchable with the display-language icon include Japanese, English, and German. The display-language icon having the icon name displayed in each language, is displayed in sequence. The icon image of the display-language icon in Japanese is "lang30.jpg", and the icon name is "Gengo Kirikae". Furthermore, in a case where the home screen is displayed on the display unit 105, the display-language icon switches to an icon having an icon name displayed in a different language every ten seconds for sequent display. After completion of display of the display-language icons having the names displayed in Japanese, English, and German, the MFP 10 displays the display-language icon having the name displayed in Japanese, again. Thus, the languages set on the screen illustrated in FIG. 7 are used repeatedly. Note that, according to the present embodiment, the user can set the icon name and the icon image, flexibly. Setting the language setting section 701 may cause the icon image file and the icon name to be set automatically.

FIG. 13 is a table for managing setting values of the language-switching application set on the UI screen illustrated in FIG. 7. The table illustrated in FIG. 13 stored in the eMMC 109, is developed into the RAM 103 when the power of the MFP 10 is turned on, "Language No" 1401 is information indicating which of the language setting sections 701 to 705 illustrated in FIG. 7 information in each row in the table is set at. The language having language No. 1 indicates the language set at the language setting section 701, and the language having language No. 2 indicates the language set at the language setting section 702. "Language ID" 1402 is language identification information regarding the set languages. According to the present embodiment, each language has a number added thereto as the identification information. For example, "01", "21", and "30" are added to English, German, and Japanese, respectively. "Icon name" 1403 indicates information regarding the icon names set at the icon name sections 706 to 710 of FIG. 7. "Icon image file" 1404 indicates information regarding the icon image files set at the icon image sections 711 to 715 of FIG. 7. In the following flowcharts, the language-switching application 314 is referred to in setting with reference to the table of FIG. 13 developed in the RAM 103.

The processing of switching the display language with the language-switching application, will be described with FIGS. 9 to 14.

Figure 9:
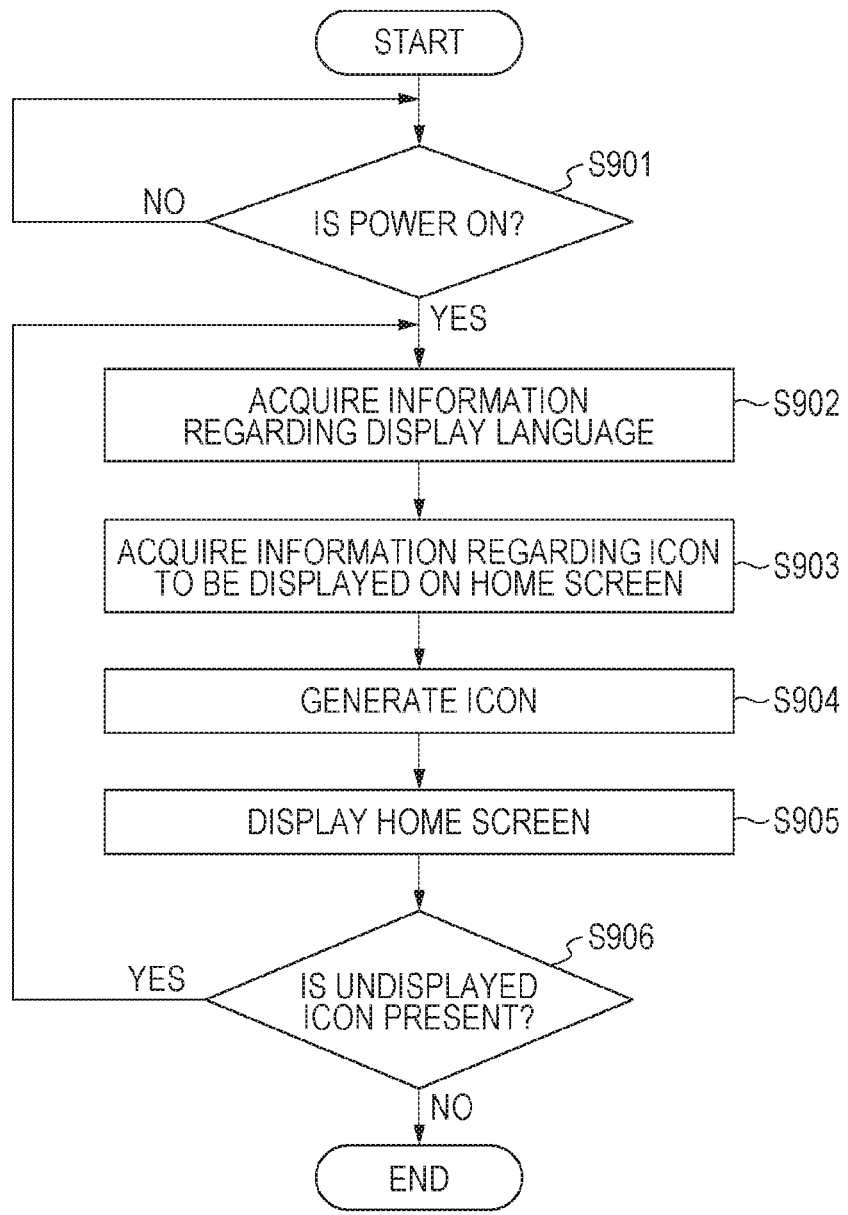
FIG. 9 is a flowchart of exemplary processing to be performed when the power of the MFP is turned on in the first embodiment.

FIG. 9 is a flowchart of processing in which the display-image generation unit 302 displays the home screen on the display unit 105 after the power of the MFP 10 is turned on, in the present embodiment. A program for executing the processing in the flowchart illustrated in FIG. 9, is stored in the ROM 102 or the eMMC 109. The CPU 101 reads and executes the program to achieve the processing. The processing in the present flowchart starts when the power of the MFP 10 is turned on. Note that, according to the present embodiment, the setting information stored in the eMMC 109 is developed into the RAM 103 after the power of the MFP 10 is turned on.

The display-image generation unit 302 acquires information regarding one icon to be displayed on the home screen, from the RAM 103 (S903). The display-image generation unit 302 acquires one row of information from information regarding the icons to be displayed on the home screen in a table illustrated in FIG. 10 stored in the RAM 103.

The table of FIG. 10 indicates the information regarding the icons to be displayed on the home screen, developed in the RAM 103. "Page" 1001 is information indicating which page of the home screen each icon is to be displayed on. "Icon name" 1002 is information indicating the character string to be displayed on the icon name portion 403 of each icon. "Icon image file" 1003 is information indicating the file name of the image to be displayed on the icon image portion 402 of each icon. "Application information" 1004 is information indicating the application to be activated after selection of each icon. For example, FIG. 10 indicates that an icon having the icon image portion 402 including the image of "copy.jpg" and the icon name portion 403 having "Copy", is to be displayed on the first page of the home screen. Furthermore, FIG. 10 indicates that selection of the copy icon by the user causes the copy application 312 to be activated.

The display-image generation unit 302 generates the icon, on the basis of the information acquired at S903 (S904). At S904, the display-image generation unit 302 acquires the icon image file from the database unit 313. For example, the display-image generation unit 302 accesses the RAM 103 through the database unit 313 and acquires image data having the file name acquired at S903. Then, the display-image generation unit 302 generates the icon in a combination of the acquired image data and the character string indicating the icon name, like the icon illustrated in FIG. 8. Then, the generated icon is stored in the RAM 103, in association with the information regarding the application to be activated at selection of the icon.

The display-image generation unit 302 causes the display unit 105 to display the home screen for displaying the completely generated icon (S905). At S905, the display-image generation unit 302 generates screen data of the home screen including the generated icon, and transmits the screen data to the display control unit 311. The display control unit 311 that has received the screen data, controls the display controller 104 through the device driver 308, to cause the display unit 105 to display the home screen.

The display-image generation unit 302 determines whether an icon that has not been completed for generation, is present (S906). The display-image generation unit 302 determines whether the information regarding an icon that has not been completed for generation, is present in the table illustrated in FIG. 10 developed in the RAM 103. In a case where an icon that has not been completed for generation is present, the display-image generation unit 302 causes the processing to go back to S902. In a case where all the icons have been completed for generation, the display-image generation unit 302 finishes the processing illustrated in FIG. 9.

Figure 11:
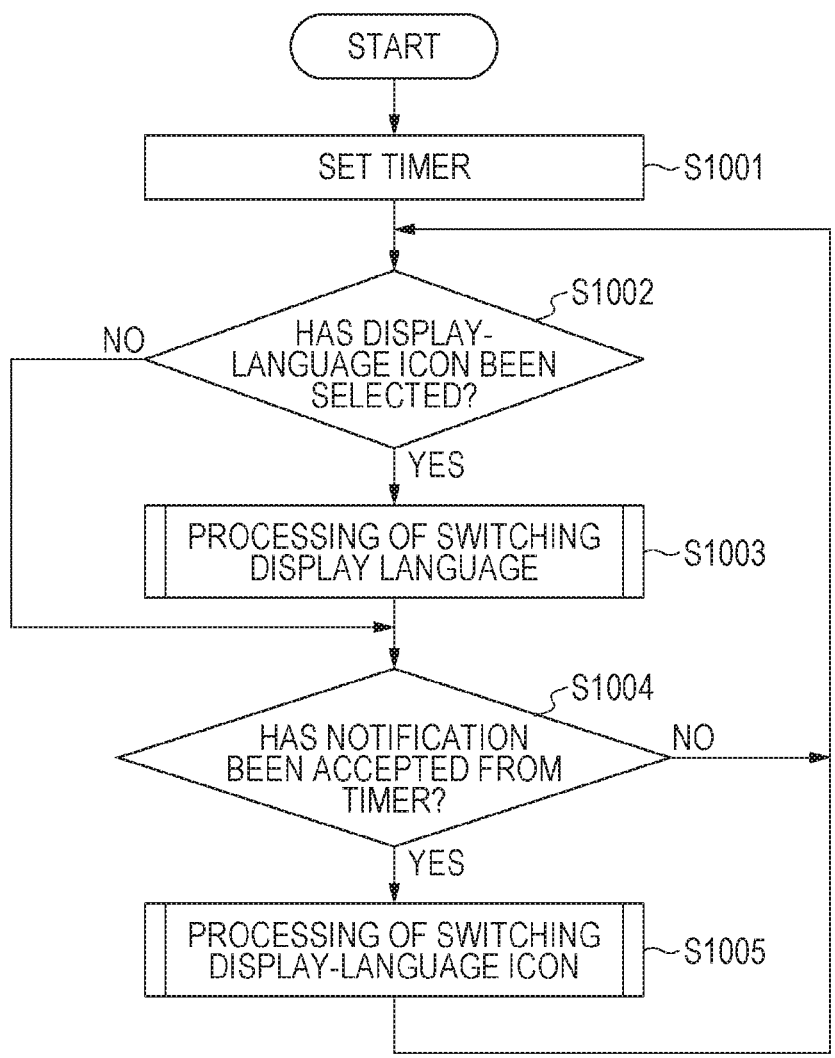
FIG. 11 is a flowchart of processing to be executed by the language-switching application in the first of embodiment.

Next, processing to be executed by the language-switching application in the present embodiment, will be described. FIG. 11 is a flowchart of the processing to be executed by the language-switching application 314. The flowchart illustrated in FIG. 11 starts in accordance with display of the home screen on the display unit 105 in the processing of the flowchart illustrated in FIG. 9 after the power of the MFP 10 is turned on. The processing illustrated in FIG. 11 is continuously executed until a screen different from the home screen is displayed on the display unit 105 after the user selects an application on the home screen.

A program for executing the processing illustrated in FIG. 11 is stored in the ROM 102, and the CPU 101 executes the program to achieve the processing.

The language-switching application 314 acquires the display-switching time set for the application, from the RAM 103 and sets the timer 118 (S1001). The language-switching application 314 controls the database unit 313 through the VM/FW unit 309. The database unit 313 acquires the display-switching time set for the language-switching application 314, from the RAM 103. Then, the language-switching application 314 controls the timer control unit 315 through the VM/FW unit 309 to set the timer 118 at the acquired display-switching time. After that, the timer 118 starts counting.

Next, the language-switching application 314 determines whether the display-language icon has been selected by the user (S1002). After the user operates the operation unit 107 and performs a tap operation to the display-language icon, the device driver 308 notifies the language-switching application 314 that the display-language icon has been selected, through the display control unit 311 and the VM/FW unit 309. At S1002, the language-switching application 314 determines whether the notification has been received. In a case where the display-language icon has been selected, the language-switching application 314 executes the processing at S1003. In a case where the display-language icon has not been selected, the language-switching application 314 causes the processing to proceed to S1004.

After the user performs the tap operation to the display-language icon, the language-switching application 314 executes the processing of switching the display language to be described later (S1003).

The language-switching application 314 determines whether a notification has been accepted from the timer 118 (S1004). The timer 118 outputs the notification to the device driver 308, in accordance with the elapse of the set time at S1001 or at S1005 to be described later. The device driver 308 that has received the notification from the timer 118, outputs the notification to the language-switching application 314 through the tinier control unit 315 and the VM/FW unit 309. In a case where it is determined at S1004 that the language-switching application 314 has received the notification, the processing at S1005 is executed. In a case where it is determined at S1004 that the language-switching application 314 has not received the notification, the language-switching application 314 causes the processing to go back to S1002.

The language-switching application 314 that has received the notification from the timer 118, executes the processing of switching the display-language icon to be described later (S1005).

Figure 12:
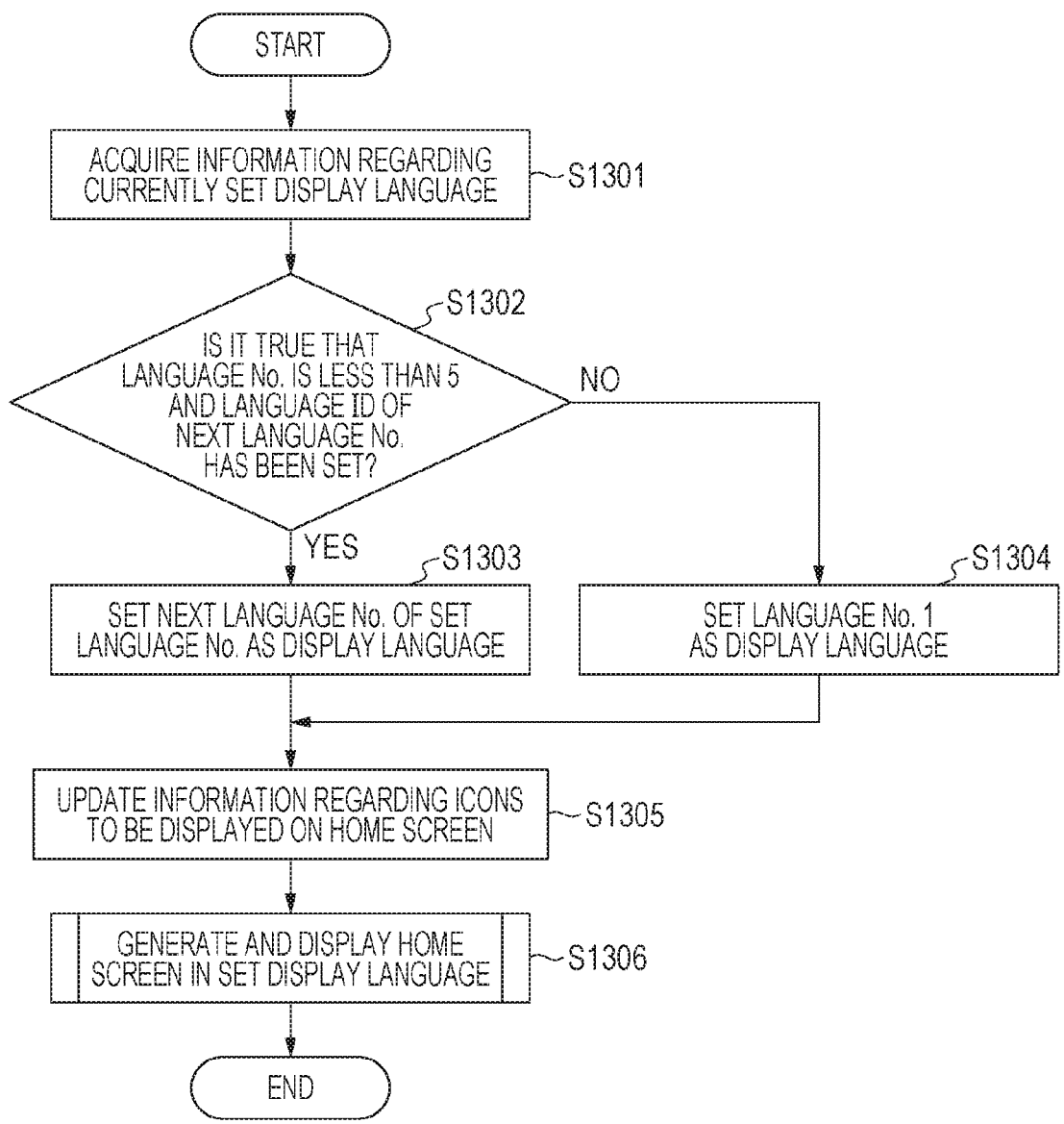
FIG. 12 is a flowchart of processing of switching the display language in setting, to be performed by the language-switching application in the first embodiment.

FIG. 12 is a flowchart of the processing to be executed by the language-switching application 314 at S1003 of FIG. 11. A program for executing the processing is stored in the ROM 102. The CPU 101 executes the program to achieve the processing.

The language-switching application 314 acquires information regarding the current language set as the display language, from the RAM 103 (S1301). The language-switching application 314 accesses the RAM 103 through the database unit 313, and acquires the language No of the currently set display language from the RAM 103. For example, in a case where the display language is set to Japanese, the language No to be acquired at S1301 is "1".

Next, the language-switching application 314 determines whether the language No acquired at S1301 is less than 5 and a language ID has been set for the next language No (S1302). For example, in a case where the language No acquired at S1301 is "1", the language-switching application 314 determines that the language No is less than 5 and a language has been set for the next language No (language No. 2) in the "Language ID" 1402, from the table illustrated in FIG. 13. In this case, the language-switching application 314 causes the processing to proceed to S1303. For example, in a case where the language No acquired at S1301 is "5", the language-switching application 314 determines that the language No is not less than 5, and causes the processing to proceed to S1304. In a case where the language No acquired at S1301 is "3" with the table of FIG. 13 set, the language-switching application 314 determines that no language IL) has been set for the next language No (language No. 4), and causes the processing to proceed to S1304.

Note that the language-switching application 314 uses the following method to determine whether a language ID has been set for the next language No of the language No acquired at S1301. The language-switching application 314 acquires the language ID corresponding to the next language No of the language No acquired at S1301, from the table illustrated in FIG. 13. In a case where the acquired language ID is a predetermined identification number (e.g., "00"), the language-switching application 314 determines that no language ID has been set. Meanwhile, in a case where the acquired language ID is a number different from the predetermined identification number, the language-switching application 314 determines that the language ID has been set.

The language-switching application 314 sets the language No of the language set as the display language, to the next language No (S1303). At S1303, the language-switching application 314 changes the language No of the language set in the RAM 103 as the display language, to the next language No. Furthermore, the language-switching application 314 acquires the language D of the new set language No, from the table illustrated in FIG. 13, and sets the language ID in the RAM 103. For example, it is assumed that "1" and "30" have been set as the language No and the language ID of the current display language, respectively. The language-switching application 314 sets "2" and "01" as the language No and the language ID of the current display language, respectively.

For causing the processing to proceed to S1304, the language-switching application 314 sets a language No of "1" and a language ID of "30" corresponding to the language No. 1, in the RAM 103 (S1304).

The language-switching application 314 updates the information regarding the icons to be displayed on the home screen, in order to display the home screen in the new set display language (S1305). The information regarding the icons to be displayed on the home screen includes, for example, the information in the table illustrated in FIG. 10. At S1305, the language-switching application 314 updates the information in necessary part from the information in the "Icon name" 1002 and the information in the "Icon image file" 1003. In a case where the new set display language is English having the language No. 2, the "Icon name" 1002 changes in English. Furthermore, the icon image file for the display-language icon changes from "lang30.jpg" to "lang01.jpg". Note that, according to the present embodiment, the information in part of the table illustrated in FIG. 10 is updated. The eMMC 109 may store a table indicating the information regarding the icons to be displayed on the home screen, every display language. In this case, the table corresponding to the language set as the new display language in accordance with the change of the display language in setting, is developed from the eMMC 109 to the RAM 103. Then, the language-switching application 314 reads, from the RAM 103, the table indicating information regarding the home screen corresponding to the new set display language at S1305.

The language-switching application 314 generates the home screen based on the information updated at S1305, and displays the home screen on the display unit 105 (S1306). At S1306, the language-switching application 314 controls the display-image generation unit 302 through the VM/FW unit 309, to execute the processing illustrated in FIG. 9. After completion of the processing at S1306, the language-switching application 314 completes the processing illustrated in FIG. 12. The processing enables display of the home screen in a different language with change of the display language in setting.

Figure 14:
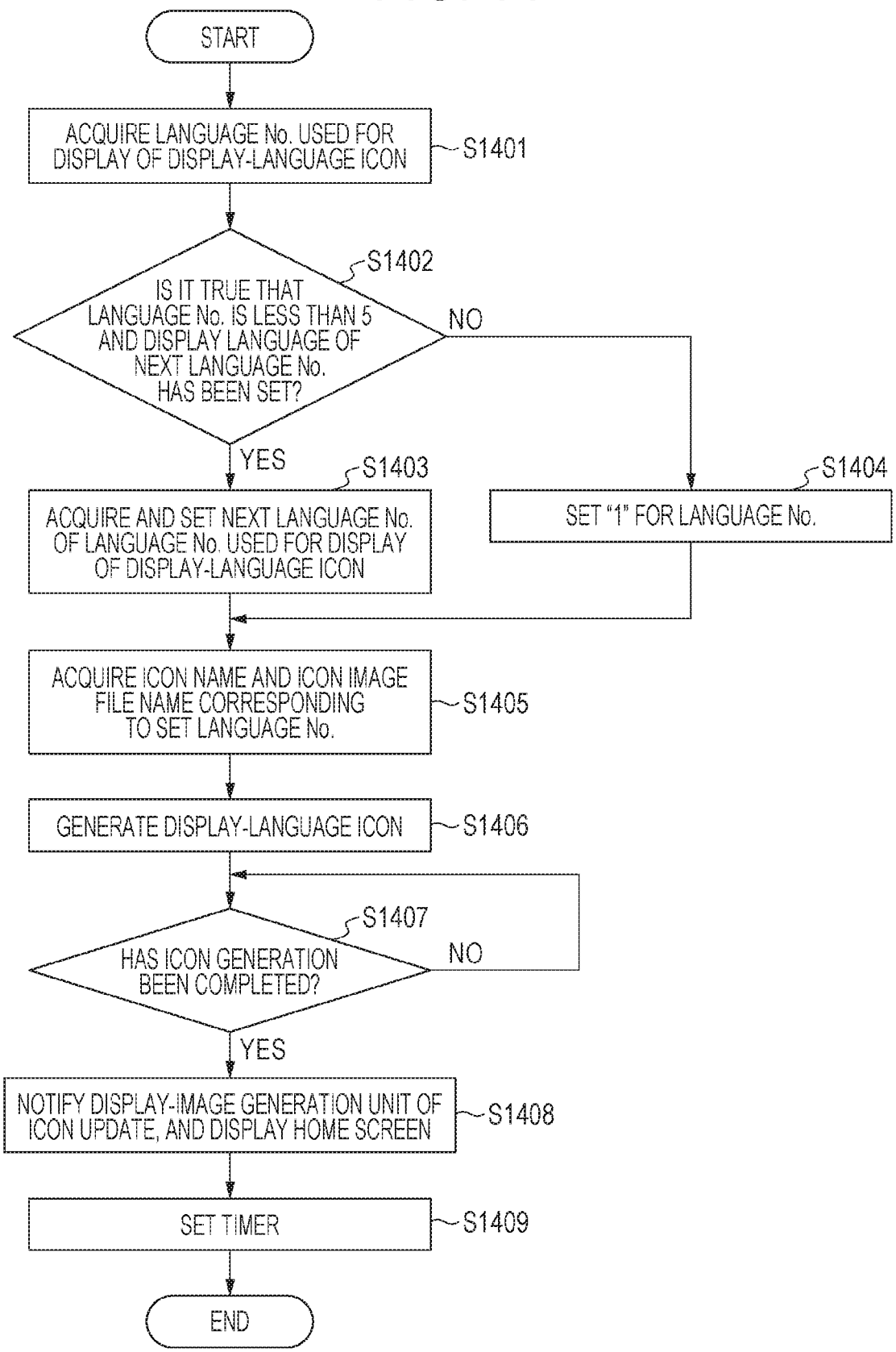
FIG. 14 is a flowchart of processing of switching the display-language icon displayed on the home screen, to be performed by the language-switching application in the first embodiment.

Next, the processing of switching the display-language icon at S1005 of FIG. 11, will be described with a flowchart illustrated in FIG. 14. A program for executing the processing in the flowchart of FIG. 14, is stored in the ROM 102. The CPU 101 executes the program to achieve the processing.

The language-switching application 314 acquires information regarding the language used for the display-language icon in setting (S1401). The information regarding the language used for the display-language icon in setting, includes, for example, the language No of the language used for display of the display-language icon. The information is stored in the RAM 103. The language-switching application 314 accesses the RAM 103, and acquires the language No of the language used for display of the display-language icon.

The language-switching application 314 determines whether the language No acquired at S1401 is less than 5 and the language ID of the next language No has been set (S1402). In a case where the acquired language No is less than 5 and the language ID of the next language No has been set, the language-switching application 314 causes the processing to proceed to S1403. In a case where the acquired language No is 5 or the language ID of the next language No has not been set, the language-switching application 314 causes the processing to proceed to S1404.

At S1402, the language-switching application 314 uses the following method to determine whether the language ID of the next language No of the language No acquired at S1401 has been set. The language-switching application 314 acquires the language ID corresponding to the next language No of the language No acquired at S1401, from the table illustrated in FIG. 13. In a case where the acquired language ID is the predetermined identification number (e.g., "00"), the language-switching application 314 determines that no language ID has been set. Meanwhile, in a case where the acquired language ID is a number different from the predetermined identification number, the language-switching application 314 determines that the language ID has been set.

The language-switching application 314 sets the next language No of the language No used for display of the display-language icon, into the RAM 103 (S1403). For example, in a case where the language No used for display of the display-language icon is "1", the language-switching application 314 sets a language No of "2" into the RAM 103.

For selection of No at S1402, the language-switching application 314 sets "1" for the language No to be used for display of the display-language icon (S1404). The language-switching application 314 sets a language No of "1" into the RAM 103.

The language-switching application 314 acquires the icon name and the icon image file name corresponding to the language No set at S1403 or S1404 (S1405). The language-switching application 314 acquires information regarding the language No set in RAM 103 at S1403 or S1404. Then, the language-switching application 314 controls the database unit 313 to access the table illustrated in FIG. 13 developed in the RAM 103, resulting in acquisition of the information regarding the icon name and the icon image file corresponding to the language No.

The language-switching application 314 generates the display-language icon (S1406). The language-switching application 314 notifies the display-image generation unit 302 of an icon generation request, through the VM/FW unit 309. Furthermore, the language-switching application 314 notifies the display-image generation unit 302 of the icon name and the icon image file name acquired at S1405. The display-image generation unit 302 generates the display-language icon, on the basis of the information acquired from the language-switching application 314. The display-image generation unit 302 acquires, from the RAM 103, the image data having the icon image file name acquired by the language-switching application 314 at S1405. The display-image generation unit 302 generates the icon based on the text data of the icon name and the image data of the icon image. Furthermore, the icon is stored in the RAM 103, in association with the language-switching application 314 as the application to be activated at selection of the icon by the user. After generation of the icon, the display-image generation unit 302 issues a completion notification of the icon generation to the language-switching application 314 through the VM/FW unit 309.

The language-switching application 314 determines whether the icon generation has been completed (S1407). The language-switching application 314 determines whether the completion notification of the icon generation has been received from the display-image generation unit 302, in a case where the language-switching application 314 has received the notification, the language-switching application 314 causes the processing to proceed to S1408. In a case where the language-switching application 314 has not received the notification, the language-switching application 314 successively performs the processing at S1407.

The language-switching application 314 generates the home screen with the new generated icon, and displays the home screen on the display unit 105 (S1408). The language-switching application 314 notifies the display-image generation unit 302 of an update request for the home screen. The display-image generation unit 302 generates the home screen with the icon generated at S1406, in accordance with the notification. Furthermore, the display-image generation unit 302 controls the database unit 313 to update the table illustrated in FIG. 10 developed in the RAM 103. The update of the table means update of the information regarding the icon name and the icon image file associated with the language-switching application in the information in the table illustrated in FIG. 10. After generation of the home screen with the icon generated at S1406, the display-image generation unit 302 outputs the screen data of the generated home screen, to the display control unit 311. The display control unit 311 controls the display unit 105 through the device driver 308, to display the generated home screen on the display unit 105.

The language-switching application 314 sets the timer 118 (S1409). The language-switching application 314 controls the timer control unit 315 through the VM/FW unit 309. The timer control unit 315 acquires the display-switching time from the RAM 103 through the database unit 313. Then, the timer control unit 315 controls the device driver 308 to set the acquired display-switching time to the timer 118. The timer 118 having the display-switching time set, starts to count elapse in time.

The language-switching application 314 executes the processing described above, so that the display language used for icon display on the home screen can switch every previously determined time. This arrangement enables even a user who cannot understand the language set as the display language, to grasp which icon is for activating the application that the user desires to use.

Second Embodiment

According to the first embodiment, both of the icon image portion 402 and the icon name portion 403 in the icon illustrated. In FIG. 8 change in display in a different language every previously determined time. The display language used for the icon name portion 403 may switch every previously determined time with the icon image portion 402 remaining unchanged. This arrangement makes the processing of the language-switching application 314 less in switching of the language used for the display-language icon.

Figure 15A:
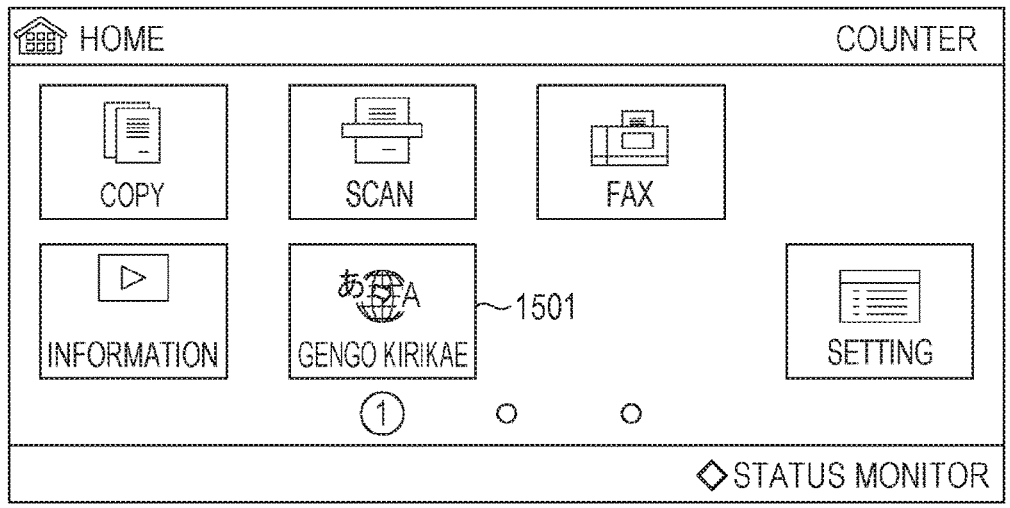
FIGS. 15A to 15C are each an illustration of an exemplary home screen to be displayed on a display unit in a second embodiment.
Figure 15B:
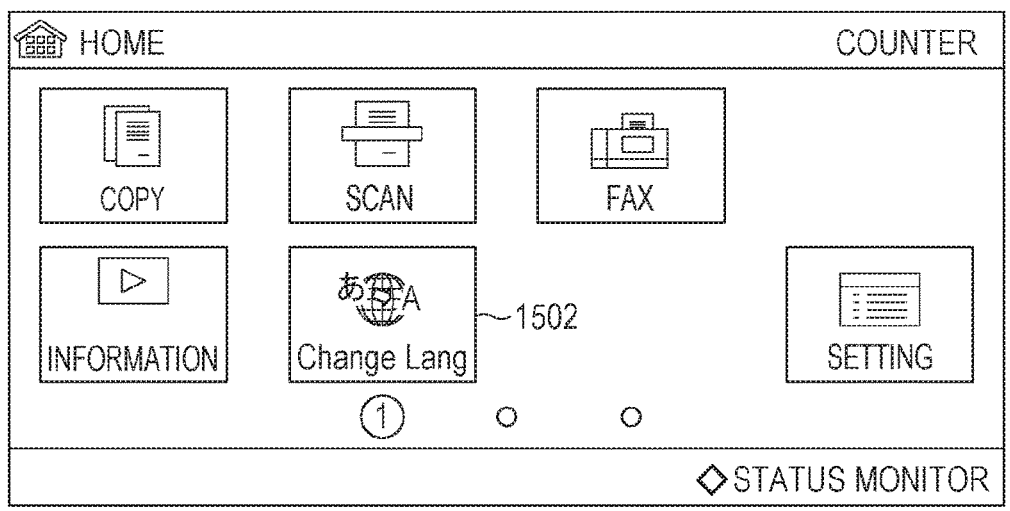
Figure 15C:
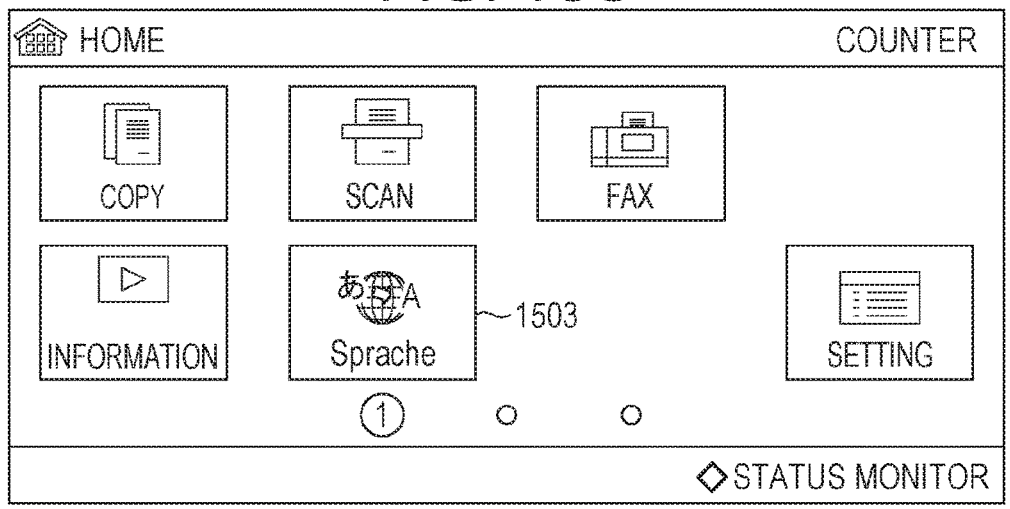

FIGS. 15A to 15C are each an illustration of an exemplary home screen to be displayed on a display unit 105 in a second embodiment. Here, display language is set to Japanese.

The home screen illustrated in FIG. 15A has a display-language icon generated in Japanese, displayed thereon. Note that processing in selection of the display-language icon 1501 by a user in the second embodiment is similar to that according to the first embodiment, and thus the description thereof will be omitted.

After the elapse of a predetermined time after display of FIG. 15A, a language-switching application 314 generates and displays a display-language icon 1502 illustrated in FIG. 15B. The display-language icon 1502 has an icon name portion displayed in English. The icon image portion of the display-language icon 1502 is similar in image to that of the display-language icon 1501 of FIG. 15A.

After the elapse of the predetermined time after display of FIG. 15B, the language-switching application 314 generates and displays a display-language icon 1503 illustrated in FIG. 15C. The display-language icon 1503 has an icon name portion displayed in German. The icon image portion of the display-language icon 1503 is similar in image to that of the display-language icon 1501 of FIG. 15A and that of the display-language icon 1502 of FIG. 15B.

According to the second embodiment, processing in which the language-switching application 314 switches the icon for display, is similar to the processing of FIG. 14 in the first embodiment. Here, only the difference from FIG. 14 will be described.

At S1405, the language-switching application 314 acquires only an icon name corresponding to language No set at S1403 or S1404. According to the second embodiment, a previously determined common icon image is used. Thus, the language-switching application 314 requires no acquisition of information regarding an icon image at S1403.

As described above, according to the second embodiment, the language used for the name of the display-language icon can switch with the processing according to switching of the display-language icon, less.

Third Embodiment

According to the first embodiment, both of the icon image portion 402 and the icon name portion 403 in the icon illustrated in FIG. 8 change in display in a different language every previously determined time. The icon image used for the icon image portion 402 may switch every previously determined time with the icon name portion 403 remaining unchanged. This arrangement makes the processing of the language-switching application 314 less in switching of the language used for the display-language icon.

Figure 16A:
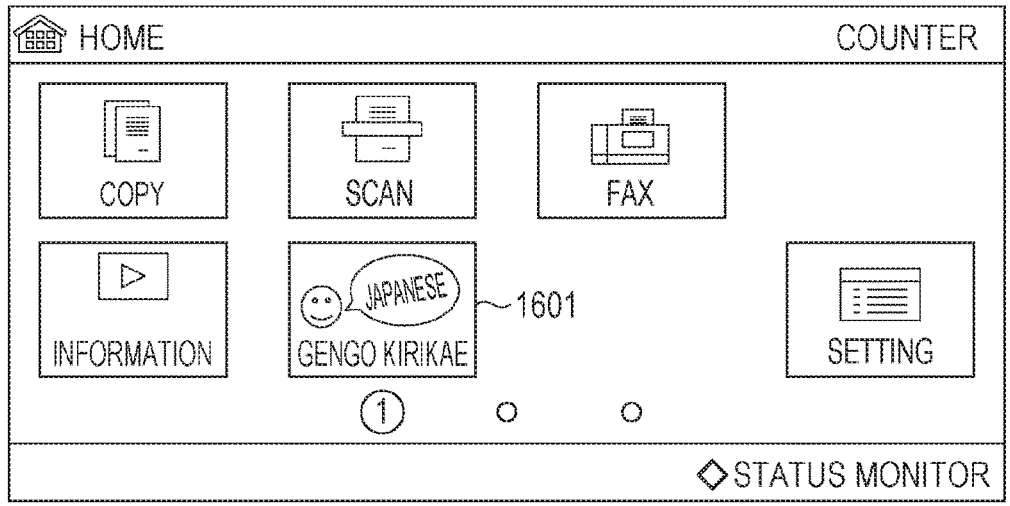
FIGS. 16A to 16C are each an illustration of an exemplary home screen to be displayed on a display unit a third embodiment.
Figure 16B:
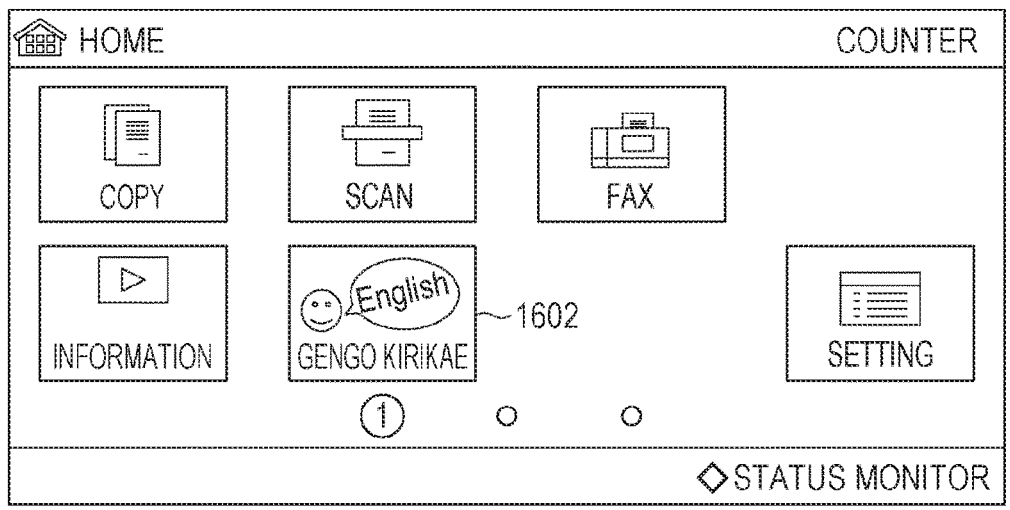
Figure 16C:
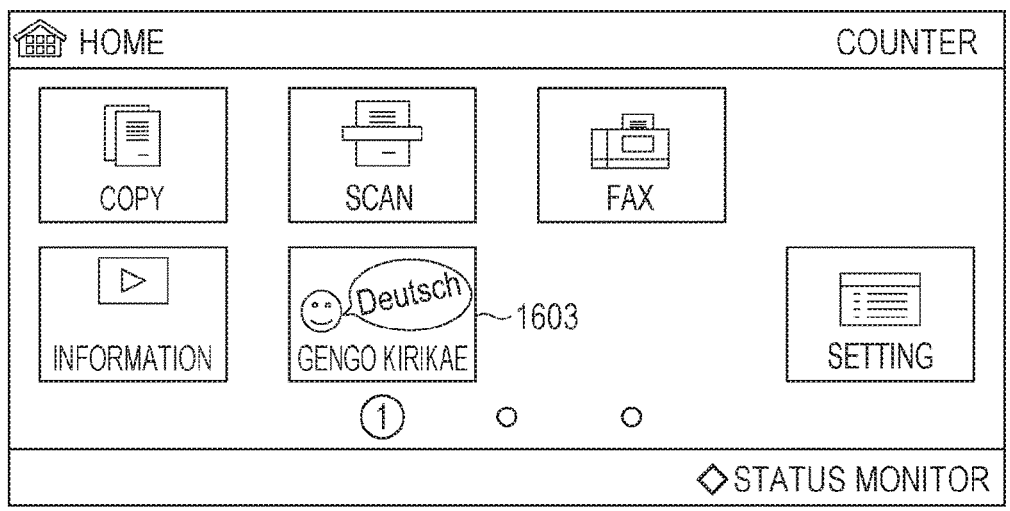

FIGS. 16A to 16C are each an illustration of an exemplary home screen to be displayed on a display unit 105 in a third embodiment. Here, display language is set to Japanese.

The home screen illustrated in FIG. 16A has a display-language icon generated in Japanese, displayed thereon. Note that processing in selection of the display-language icon 1601 by a user in the third embodiment is similar to that according to the first embodiment, and thus the description thereof will be omitted.

After the elapse of a predetermined time after display of FIG. 16A, a language-switching application 314 generates and displays a display-language icon 1602 illustrated in FIG. 16B. The display-language icon 1602 has an icon image different from that of the display-language icon 1601. However, the icon name portion 403 is displayed in the language set as the display language.

After the elapse of the predetermined time after display of FIG. 16B, the language-switching application 314 generates and displays a display-language icon 1603 illustrated in FIG. 16C. The display-language icon 1603 has an icon image different from those of the display-language icon 1601 and the display-language icon 1602. However, the icon name portion of the display-language icon 1603 is displayed in the display language set to the display-language icon 1601 of FIG. 16A and the display-language icon 1602 of FIG. 16B.

According to the third embodiment, processing in which the language-switching application 314 switches the icon for display, is similar to the processing of FIG. 14 in the first embodiment. Here, only the difference from FIG. 14 will be described.

At S1405, the language-switching application 314 acquires information regarding an icon image corresponding to language No set at S1403 or S1404. According to the third embodiment, the language-switching application 314 acquires no text information regarding an icon name. Thus, the language-switching application 314 requires no acquisition of the text information regarding an icon name at S1403.

Note that, according to the third embodiment, preferably, the icon images are recognizable to users in the respective different languages. Preferably, for example, display of a word in the language on each icon image as in FIGS. 16A to 16C causes the display-language icon to be grasped as the icon for switching the display language set in an MFP 10.

As described above, according to the third embodiment, the display-language icon having the name displayed in a different language can be displayed on the home screen with the processing according to switching of the display-language icon, less.

Other Embodiments

Each embodiment describes that selection of the display-language icon by the user causes display of the home screen in the display language previously determined to be used. Selection of the display-language icon by the user may cause display of a setting screen for setting the display language.

Each embodiment describes that the language used for display of the display-language icon for setting the display language changes every predetermined time. All the icons displayed on the home screen may switch to the display in a different language every previously determined time.

According to the present disclosure, in an information processing device that executes processing corresponding to an icon selected by a user, even a user who uses any language can select an icon associated with desired processing, easily.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™, a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-132480, filed Jul. 12, 2018, which is hereby incorporated by reference herein in its entirety.

What is claimed is:

1. An information processing device capable of executing a plurality of functions, the information processing device comprising:
a display configured to display an icon selection screen displaying at least a first icon and a second icon;
one or more processors; and
one or more memories storing instructions, which when executed by the one or more processors, cause the information processing device to:
set a display language of the display of the information processing device;
display a name of the first icon in the set display language on the icon selection screen;
accept selection of the first icon through the icon selection screen displayed by the display;
execute processing of a function corresponding to the first icon, in accordance with the acceptance of selection of the first icon; and
display a name of the second icon comprising a language-switching icon in a plurality of types of languages different from the set display language, the language-switching icon being an icon for setting the display language.
wherein in a case where the language-switching icon displayed on the display is instructed, the set display language is switched a different language.

2. The information processing device according to claim 1, wherein the name of the language-switching icon is displayed in a different type of language every predetermined time.

3. The information processing device according to claim 1, wherein the first icon includes an image indicating the function and a name of the function.

4. The information processing device according to claim 2, wherein the one or more processors do not switch the language used for display of the name of the first icon different from the language-switching icon.

5. The information processing device according to claim 3, wherein the one or more processors set a type of language different from the display language set by the setting as the display language, in accordance with selection of the language-switching icon.

6. The information processing device according to claim 3, wherein the display displays the icon selection screen displaying the name of each icon in the language newly set, in accordance with selection of the icon language-switching.

7. The information processing device according to claim 1, wherein the instructions, when executed by the one or more processors, further cause the information processing device to:
  measure elapsed time after display of the second icon; and
  display the name in the language different from the language used for display of the name, based on the time measured.

8. The information processing device according to claim 7, wherein the instructions, when executed by the one or more processors, further cause the information processing device to:
  notify to perform the switching, in accordance with the time measured,
  wherein the switching switches the language used for display of the name, based on the notification.

9. The information processing device according to claim 8, wherein the notification outputs the notification to perform the switching at arrival of the elapsed time after display of the second icon, at the predetermined time.

10. The information processing device according to claim 1, wherein the instructions, when executed by the one or more processors, further cause the information processing device to:
  set languages to be used in display switching.

11. The information processing device according to claim 10, wherein the one or more processors switch, in sequence in display, the second icon having the name displayed in each of the languages set, to repeatedly display the second icon having the name displayed in each of the languages.

12. The information processing device according to claim 10, wherein setting the languages is performed using a remote user interface (UI).

13. The information processing device according to claim 1, wherein the one or more processors continuously execute switching in display of the first icon until the display completes displaying the icon selection screen.

14. The information processing device according to claim 1, wherein the plurality of functions includes at least one of copying, scanning, and faxing.

15. A method of controlling an information processing device capable of executing a plurality of functions, the method comprising:
  displaying an icon selection screen displaying at least a first icon and a second icon on a display;
  setting a display language of the display of the information processing device;
  displaying a name of the first icon in the set display language on the icon selection screen;
  accepting selection of the first icon through the icon selection screen;
  executing processing of a function corresponding to the first icon, in accordance with the accepting of selection of the first icon; and
  displaying a name of the second icon comprising a language-switching icon in a plurality of types of languages different from the set display language, the language-switching icon being an icon for setting the display language,
  wherein in a case where the language-switching icon displayed on the display is instructed, the set display language is switched to a different language.

16. A non-transitory computer-readable storage medium storing a computer program for causing a computer to perform a method of controlling an information processing device capable of executing a plurality of functions, the method comprising:
  displaying an icon selection screen displaying at least a first icon and a second icon on a display;
  setting a display language of the display of the information processing device;
  displaying a name of the first icon in the set display language on the icon selection screen;
  accepting selection of the first icon through the icon selection screen;
  executing processing of a function corresponding to the first icon, in accordance with the accepting of selection of the first icon; and
  displaying a name of the second icon comprising a language-switching icon in a plurality of types of languages different from the set display language, the language-switching icon being an icon for setting the display language,
  wherein in a case where the language-switching icon displayed on the display is instructed, the set display language is switched to a different language.

* * * * *